US010797990B2

(12) United States Patent
Power et al.

(10) Patent No.: US 10,797,990 B2
(45) Date of Patent: Oct. 6, 2020

(54) SERVER REDUNDANT NETWORK PATHS

(71) Applicant: Microsoft Technology Licensing, LLC, Redmond, WA (US)

(72) Inventors: Adrian Lindsay Power, Seattle, WA (US); Jonathan Rayburn Belk, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/351,056

(22) Filed: Mar. 12, 2019

(65) Prior Publication Data

US 2020/0186460 A1   Jun. 11, 2020

Related U.S. Application Data

(60) Provisional application No. 62/777,684, filed on Dec. 10, 2018.

(51) Int. Cl.
*G06F 13/00*   (2006.01)
*H04L 12/707*   (2013.01)
(Continued)

(52) U.S. Cl.
CPC .......... *H04L 45/22* (2013.01); *H04L 41/0659* (2013.01); *H04L 41/0668* (2013.01);
(Continued)

(58) Field of Classification Search
CPC ......... G06F 13/00; H04L 12/24; H04L 12/66; H04L 12/933; H04L 12/2602; H04L 29/06; H04L 29/08072; H04L 29/06027; H04L 41/12; H04L 41/22; H04L 41/803; H04L 43/00; H04L 45/00; H04L 45/02; H04L 45/04; H04L 47/10; H04L 49/15; H04L 49/70; H04L 65/103; H04L 65/104; H04L 65/1006; H04L 65/1036; H04L 65/1063; H04L 41/0659; H04L 41/0668; H04L 43/10; H04L 45/22; H04L 45/24; H04L 45/50; H04Q 3/68; H04W 84/18; H04W 88/16
(Continued)

(56) References Cited

U.S. PATENT DOCUMENTS 6,763,479 B1   7/2004   Hebert
8,085,794 B1   12/2011   Niver et al.
(Continued)

FOREIGN PATENT DOCUMENTS

EP   2696542 A1   2/2014

OTHER PUBLICATIONS

Monroy-Hernandez, et al., "Dell Emc Vxrail Network Guide", In White Paper of DELL EMC, Dec. 2018, 51 Pages.
(Continued)

*Primary Examiner* — Robert B Harrell
(74) *Attorney, Agent, or Firm* — Newport IP, LLC; Han Gim

(57) ABSTRACT

In a group of servers, a link fault to one of the servers is detected. In response to detecting the link fault, network traffic that uses the faulty link is distinguished and the distinguished network traffic is forwarded. Applicable backup links are activated, and the distinguished traffic is redirected using an activated backup link for the faulty link.

20 Claims, 8 Drawing Sheets

(51) Int. Cl.
*H04L 12/723* (2013.01)
*H04L 12/24* (2006.01)
*H04L 12/26* (2006.01)

(52) U.S. Cl.
CPC .............. *H04L 43/10* (2013.01); *H04L 45/24* (2013.01); *H04L 45/50* (2013.01)

(58) Field of Classification Search
USPC .................................. 370/254, 401; 709/224
See application file for complete search history.

(56) References Cited

U.S. PATENT DOCUMENTS

| | | | |
|---|---|---|---|
| 8,804,538 | B1 | 8/2014 | Higgins et al. |
| 9,025,434 | B2 | 5/2015 | Maltz et al. |
| 9,363,144 | B1 * | 6/2016 | Peresini .................. H04Q 3/68 |
| 2006/0256767 | A1 | 11/2006 | Suzuki et al. |
| 2008/0013457 | A1 | 1/2008 | Berman et al. |
| 2012/0314582 | A1 | 12/2012 | Smith et al. |
| 2014/0112122 | A1 | 4/2014 | Kapadia et al. |
| 2015/0139229 | A1 | 5/2015 | Kamble et al. |
| 2017/0019428 | A1 * | 1/2017 | Cohn .................. H04L 65/1036 |

OTHER PUBLICATIONS

"Juniper Networks EVPN Implementation for Next-Generation Data Center Architectures", Retrieved from: https://www.juniper.net/assets/us/en/local/pdf/whitepapers/2000606-en.pdf, Jul. 2015, 62 pages.

"International Search Report and Written Opinion Issued in PCT Application No. PCT/US19/064089", dated Feb. 25, 2020, 20 Pages.

Tate, et al., "IBM j-type Data Center Networking Introduction", Published by IBM Redbooks Publication, May 7, 2010, 286 Pages.

* cited by examiner

… (1)

SERVER REDUNDANT NETWORK PATHS

PRIORITY APPLICATION

This application claims the benefit of and priority to U.S. Provisional Application No. 62/777,684, filed Dec. 10, 2018, the entire contents of which are incorporated herein by reference.

BACKGROUND

A data center is a facility that houses computer systems and various networking, storage, and other related components. Data centers may, for example, provide computing services to businesses and individuals as a remote computing service or provide "software as a service" (e.g., cloud computing). A data center may house hundreds or thousands of servers. Each server may host a number of virtual machines and other resources. It is important to prevent downtime due to hardware and network failures and other issues that may prevent the operation of services provided by the data center. Some data centers may implement ways to provide some resiliency to failures that might prevent a loss of network communications. Such resiliency may exist from Tier-1 networking elements to the higher tier networking elements. However, since each individual server typically only uses a single connection to the first network element, referred to as a Tier-0 element, there may be a single point of failure that may isolate a server or an entire rack of servers from the network. When a data center experiences server connectivity issues, loss of data and services may result, preventing users from providing quality services to their downstream customers, which may result in lost revenue and customer dissatisfaction. Production loss and inefficiencies with respect to computing resources can be exacerbated when the data center is unable to quickly isolate and correct the cause of a connection failure.

It is with respect to these considerations and others that the disclosure made herein is presented.

SUMMARY

The disclosed embodiments describe technologies for providing an alternate network path to help prevent servers from becoming isolated from the main data plane network. The technologies may be implemented in conjunction with servers and other devices that require network resiliency.

In some implementations, networks may use a combination of Network Interface Card (NIC) teaming and multi-chassis link aggregation to provide a first and second interface into the data plane network to guard against a single cable failure or single Top of Rack (TOR) network element failure. These methods may be suited for operating systems and applications that are configured to recognize the additional network resources and detect and respond to a failure in one of the network connections. However, NIC teaming and multi-chassis link aggregation may be difficult to implement for cloud scale hosted virtual machine services because some operating systems and software applications may not be designed to recognize two network interfaces. Additionally, there may be issues with a possible loss of traffic forwarding capability that may be difficult to prevent and debug.

In some embodiments, in order to provide network resiliency down to the server level, each server may be connected to two different Tier-0 network elements through diversely routed facilities (e.g., optical or copper cables). Providing a second NIC to each server may be costly when using custom NICs with complex acceleration logic. It can therefore be more cost effective to duplicate the signal at the NIC's physical interface on the network side of the acceleration logic and provide a way of connecting these two network interfaces to diverse Tier-0 network elements. The disclosed techniques provide this ability.

Additionally, a method is disclosed for identifying failed network elements or failed network facilities (e.g., cabling) and rearranging the existing traffic flows through the network so that normal network availability may be quickly restored. Any network outage that persists for more than one second, for example, may be deemed over the threshold for what is considered an outage. Additionally, some software applications may be sensitive to network impairments that persist for 100 milliseconds or less. The disclosed methods incorporate techniques that can quickly react to failures to rearrange traffic flows onto the hardware-provided alternate network interface path between a server and the network elements.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
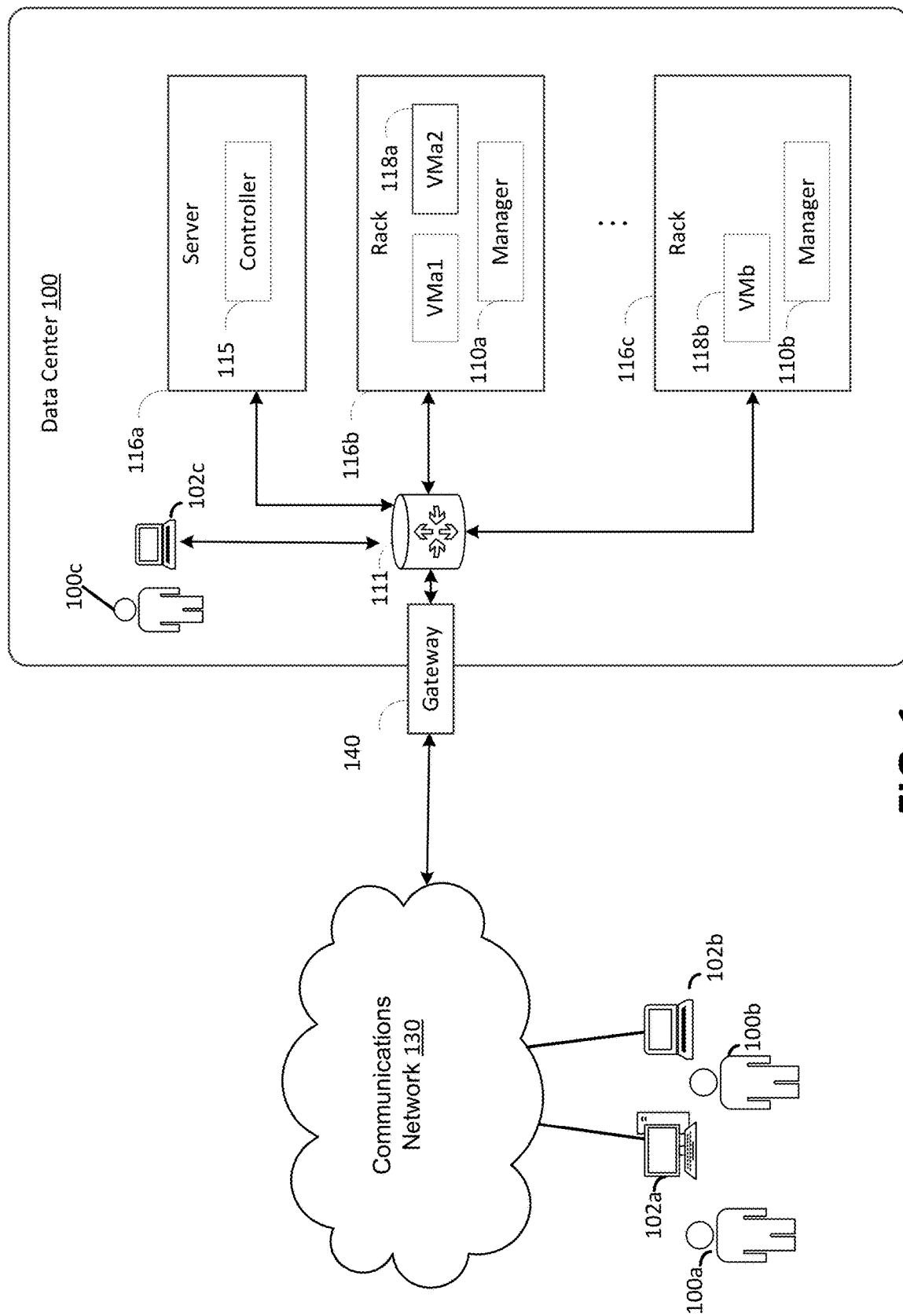
FIG. 1 is a diagram illustrating a data center for providing virtualized resources in accordance with the present disclosure.

The disclosed embodiments describe technologies for providing an alternate network path to prevent servers from becoming isolated from the main data plane network. In an embodiment, a physical layer device (PHY) may be installed at one end of a Direct Attach Cable (DAC). This PHY may provide a cross-point switch capability that can rearrange traffic at OSI model Layer 1 (physical layer). These PHY devices may be used in a networking chassis to rearrange traffic around extracted or failing card slots. In an embodiment, the PHY devices can be repurposed to operate inside a server's Quad Small Form-factor Pluggable (QSFP)-based DAC cable to rearrange traffic across two different ToR network elements. Additionally, a 3-way out-of-band control plane signal may be provided that can be driven and monitored by any/all of the three link partners (one server and two ToRs) to signal the intended active communication path and coordinate the switchover event towards the alternate communication path. In one embodiment, an active DAC Y-cable may be implemented that interconnects one server to two ToRs. The Y-cable assembly may be interchangeable and incorporate separable sub-assemblies that allow for field serviceability on a per-path level.

Further disclosed are methods of programming the Tier-0 and Tier-1 network elements to anticipate or detect the failure of a server's primary network path and provide a pre-provisioned alternate path that can quickly be put into operation to divert existing session traffic along the alternate path. At least two different techniques are described with differing levels of debuggability and failure response times.

The disclosed techniques allow for restoration of network connectivity to a server if its connection to the Tier-0 element fails. Protection against equipment failure of the Tier-0 element may be enabled by providing a redundant Tier-0 element and providing a method of quickly diverting established traffic flows through the alternate path. Protection against facility failure of the DAC cable between the server and the Tier-0 element may be enabled by providing additional conductors outside the NIC and QSFP. Failures of individual DAC facilities typically only affect the server that the DAC connects to. Unassociated traffic flows to other servers may not be affected.

Some signaling may be active on the standby facility to ensure that protection is available. If the standby path is not available, in one embodiment, a Loss of Protection alarm may be generated. Bit error rate (BER) measurements may be intermittently performed on the standby path to provide an assurance that a protection-switch event will result in a network connectivity restoration with acceptable performance. In an embodiment, the BER level of both the active and standby paths may be monitored and the option to switch to the alternate path based on a perceived improved BER may be provided. In some embodiments, two failures within the row may be absorbed if they do not directly involve the same element twice. Additionally, a DAC failure to a server plus an active optical cable (AOC) failure between any ToR-MoR (MoR may be defined as Middle of Row or a leaf or other Tier-1 device) elements may be concurrently tolerated. In some embodiments, a Tier-0 equipment failure in one server rack may not impact the system's ability to tolerate failures of DACs or Tier-0 devices in other server racks.

FIG. 1 illustrates an example computing environment in which the embodiments described herein may be implemented. FIG. 1 illustrates a data center 100 that configured to provide computing resources to users 100a, 100b, or 100c (which may be referred herein singularly as "a user 100" or in the plural as "the users 100") via user computers 102a, 102b, and 102c (which may be referred herein singularly as "a computer 102" or in the plural as "the computers 102") via a communications network 130. The computing resources provided by the data center 100 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 100 may include servers 116a, 116b, and 116c (which may be referred to herein singularly as "a server 116" or in the plural as "the servers 116") that provide computing resources available as virtual machines 118a and 118b (which may be referred to herein singularly as "a virtual machine 118" or in the plural as "the virtual machines 118"). The virtual machines 118 may be configured to execute applications such as Web servers, application servers, media servers, database servers, and the like. Other resources that may be provided include data storage resources (not shown on FIG. 1) and may include file storage devices, block storage devices, and the like. Servers 116 may also execute functions that manage and control allocation of resources in the data center, such as a controller 115. Controller 115 may be a fabric controller or another type of program configured to manage the allocation of virtual machines on servers 116.

Referring to FIG. 1, communications network 130 may, for example, be a publicly accessible network of linked networks and may be operated by various entities, such as the Internet. In other embodiments, communications network 130 may be a private network, such as a corporate network that is wholly or partially inaccessible to the public.

Communications network 130 may provide access to computers 102. Computers 102 may be computers utilized by users 100. Computer 102a, 102b or 102c may be a server, a desktop or laptop personal computer, a tablet computer, a smartphone, a set-top box, or any other computing device capable of accessing data center 100. User computer 102a or 102b may connect directly to the Internet (e.g., via a cable modem). User computer 102c may be internal to the data center 100 and may connect directly to the resources in the data center 100 via internal networks. Although only three user computers 102a, 102b, and 102c are depicted, it should be appreciated that there may be multiple user computers.

Computers 102 may also be utilized to configure aspects of the computing resources provided by data center 100. For example, data center 100 may provide a Web interface through which aspects of its operation may be configured through the use of a Web browser application program executing on user computer 102. Alternatively, a stand-alone application program executing on user computer 102 may be used to access an application programming interface (API) exposed by data center 100 for performing the configuration operations.

Servers 116 may be configured to provide the computing resources described above. One or more of the servers 116 may be configured to execute a manager 110a or 110b (which may be referred herein singularly as "a manager 110" or in the plural as "the managers 110") configured to execute the virtual machines. The managers 110 may be a virtual machine monitor (VMM), fabric controller, or another type of program configured to enable the execution of virtual machines 118 on servers 116, for example.

It should be appreciated that although the embodiments disclosed above are discussed in the context of virtual machines, other types of implementations can be utilized with the concepts and technologies disclosed herein. For example, the embodiments disclosed herein might also be utilized with computing systems that do not utilize virtual machines.

In the example data center 100 shown in FIG. 1, a router 111 may be utilized to interconnect the servers 116*a* and 116*b*. Router 111 may also be connected to gateway 140, which is connected to communications network 130. Router 111 may manage communications within networks in data center 100, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 100 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, tablets, and various other devices that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 2:
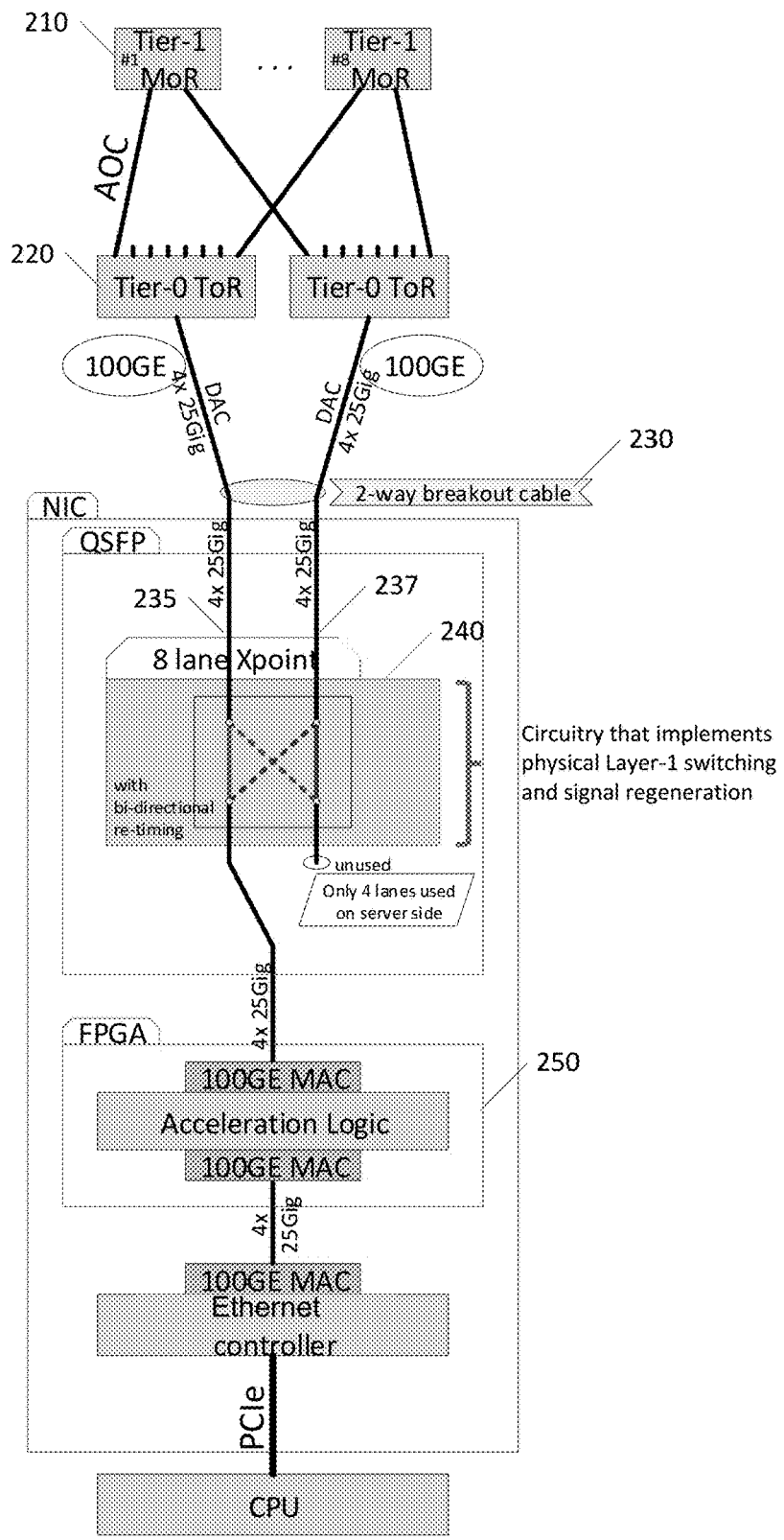
FIG. 2 is an example resilient network topology in accordance with the present disclosure.

Referring to FIG. 2, illustrated is an example resilient network topology with layer-1 switching implemented at the server QSFP. Illustrated are across two Tier-1 MoR network elements 210 connected to two Tier-0 ToR network elements 220. Custom hardware 240 may be used that implements physical Layer-1 switching and signal regeneration within the QSFP device. A dual cable 230 leads to the Tier-0 elements. One of dual cables 235 and 237 are connected to FPGA 250 based on the switching.

Figure 3:
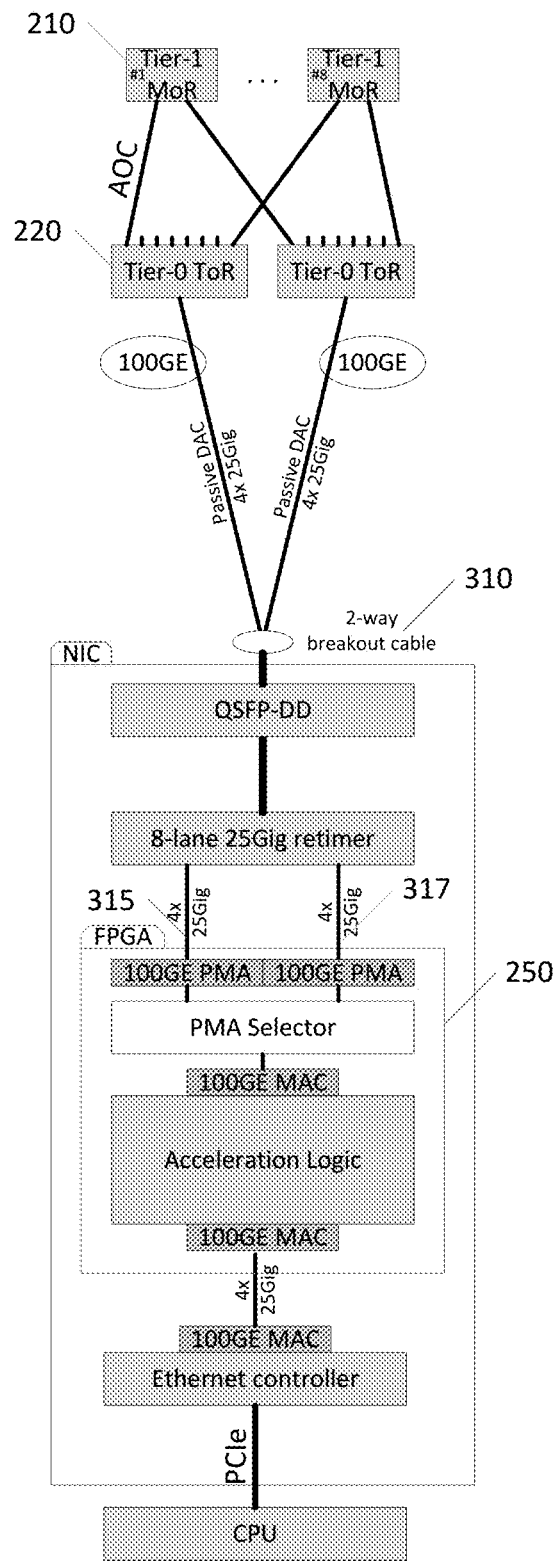
FIG. 3 is an example resilient network topology in accordance with the present disclosure.

Referring to FIG. 3, illustrated is an Active DAC with a gearbox solution, showing a resilient network topology with Layer-1 switching inside the FPGA 250, which provides a passive DAC 310 option for some NIC implementations. The FPGA 250 may monitor for link activity on both sides, and select data from one interface (315, 317) at a time.

In some embodiments, control and status signaling may be implemented to indicate an active communication path corresponding to one of two network interfaces. In some embodiments, the control and status signaling may be implemented as an in-band signal. In one embodiment, out of band (OOB) active/standby control and status signaling may be implemented using an additional conductor that is added to the DAC cable. This OOB signal contacts three points: the server NIC's QSFP and the Normal and Protect ToR QSFPs that correspond to that server. Each server may use its own dedicated OOB signal to independently select the active/standby path. A switchover of active/standby at one server may not affect other servers in the rack or row. In some embodiments, a rack may support a random mix of servers selecting between the alternative and the normal ToR.

In one embodiment, the OOB signal can be a 2-level active/standby signal or a serial bus with multi-master capability. Changes in the active/standby state can be driven by either ToR or by the server. A change initiated by any one may generate an interrupt on the other two.

The server may initiate a fail-over to the alternate path when the currently-active path link degrades below tolerance. On a per-server basis, the active ToR may initiate a fail-over to divert traffic to the standby ToR port if the signal from the server degrades below a predetermined threshold. If the active ToR determines that a reset or power upset is imminent, then it may switch all servers away to the peer ToR.

The standby ToR may initiate a fail-over to force traffic onto itself if the active ToR fails to generate heartbeat messages for a sustained duration. In some embodiments, administrators may log in to either ToR to command a switchover of any individual server port.

In some embodiments, Tier-1 network elements may be pre-provisioned to handle a failover event using a tunneling protocol or a protocol that directs data from one node to the next based on short path labels rather than long network addresses. In one embodiment, routes to a particular server may be consolidated into a single 2-member equal-cost multi-path (ECMP) group. One ECMP member is a device port that connects to the Normal (active) Tier-0. The other ECMP member is a device port that connects to that server's Protect (backup or passive) Tier-0. The ECMP setup may automatically divert traffic to the Protect Tier-0 if the Normal Tier-0 fails. Some ECMP implementations strive to distribute traffic evenly across all members that are active. One distinction is where the 2-way ECMP is purposefully biased so that only one member of the ECMP normally carries 100% of the traffic even when the other member is in a Link-Up state and is capable of carrying traffic. To implement this effect, the ECMP is purposefully biased through control plane provisioning to create a special hash configuration that normally disfavors the Normally-0%-Link from carrying any traffic. However, the ability of the ECMP to divert traffic away from members that are Link-Down is not compromised. So in the event that the Normally-100%-Link transitions to a Link-Down state, the ECMP will divert traffic to the only remaining link such that its traffic load goes from 0% to 100%.

An alternative method to implement this traffic redirection mechanism is to create an ECMP group with only one member. This 1-way ECMP serves as a common path for all traffic destined to a particular server, so it is very quick for the control plane to update this ECMP so that its sole member is either a device port that attaches to the Normal Tier-0 element or a device port that connects to the Protect Tier-0 element.

The 2-way ECMP with 100%-vs-0% bias may result in a faster response to a member link failure because the member-disqualification may be performed in low-level software such as the switch ASIC's or device driver software. The 1-way ECMP relies on higher layer software to re-provision the ECMP's sole member so that it maps to the device port that is connected to the Normal Tier-0 or the device port that is connected to the Protect Tier-0.

Tier-0 elements may also provision 2-way ECMP groups for each of their directly connected servers. Normal flows (not recycled traffic) to a particular server may be consolidated into a 2-member ECMP group. In an embodiment, one ECMP member may be a device port that connects to the server. The other ECMP member may point to the Tier-1 MoRs which may be used to recycle traffic that is found to be undeliverable due to a server link failure. The 2-way ECMP may be biased so that 100% of the traffic normally flows to the device port that directly connects to the server when the server is Link-Up.

When a server link is down, the 2-way ECMP may automatically select the alternative member. Even though the alternative member was biased so that it normally carries 0% of traffic, it will immediately transition to 100% capacity when it is the only qualified member. Traffic taking this alternate path back up to the Tier-1s may be referred to as "Recycled" traffic, and may distinguished or tagged with an identifier that distinguishes this traffic as having been rejected by the first-pass Tier-0 element. The special label may be IPinIP encapsulation, MPLS tunnel, or a VLAN tag. For example, a VLAN tag (VID=99) may be pushed onto these 'Recycle' packets.

In one example, all Recycle traffic from all of the servers that have a down link may be aggregated together and forwarded back up to the Tier-1s with VID=99. This Recycle-traffic may be distributed over all eight links to Tier-1 elements, so the next-hop is a single 8-way ECMP group with the 8 device ports that connect to Tier-1 elements as members. The aggregate Recycle traffic at the Tier-1 elements will key off the special VLAN tag (or other distinguishing treatments) to route the Recycle traffic to Protect Tier-0 elements and further along pre-provisioned Protect-side traffic paths.

In another example, traffic that is undeliverable to a server due to a Link-Down of the Normal Tier-0 server connection is recycled back up to the Tier-1 elements with an explicit MPLS label that identifies the particular server that the traffic is intended for. In this way, the intervening Tier-1s and Protect side Tier-0 do not rely on routing techniques to convey traffic to the intended server, but instead can simply key off the MPLS label to forward traffic along a pre-provisioned label-switched path that is particular to an individual destination server.

The 2-way ECMP decision points, VLAN-or-MPLS applications, and 8-way ECMP for Recycle-traffic may be statically provisioned at boot time and configured to divert traffic in response to an indication of a DAC-server failure. In one example with 24 servers located in a common rack, there are 24 2-way ECMP groups, one for each server, which may be implemented and may operate independently.

In the background, the Tier-0 devices with active server connections may send a copy of its Active-state-flow routing tables to the Standby Tier-0 so that the Standby Tier-0 is always prepared to route these per-server flows as soon as they appear. This may be performed at a predetermined rate. Failover operations do not rely on routing table changes to develop a workaround path. Routing tables always forward to ECMP groups as the next hop, so the ECMP groups and pre-provisioned backup paths may be configured to quickly effect traffic restoration.

One source of Recycle traffic may be traffic sourced from a Tier-0's locally active server port but destined to a locally standby server port (also referred to as "hairpin" traffic). The two Tier-0s that support a rack of servers may have a mix of active/standby state on a per-server basis. Any server port that is in Active State on one Tier-0 should be in Standby state on the other Tier-0. Traffic sourced from a server on one Tier-0 that is destined for a server within the same rack will have Layer-3 routes set up to the destination server on both the Active and Standby Tier-0. But only the Active may be configured to deliver.

Another source of Recycle traffic 2 may be traffic sourced from Tier-1 (other server rack within this row, or from another row, or from WAN) but was delivered to the Standby Tier-0 due to transient configuration event or due to an AOC failure.

In both of these cases, a Tier-0 has touched traffic that is destined to a server port that is currently in its Standby state. To move this traffic over to the peer Tier-0 (which has this port in Active state), traffic may be sent up to the Tier-1s. Before forwarding this 'Recycle' traffic to the Tier-1s, the Tier-0 adds a VLAN tag (VID=99, for example) to distinguish this traffic as already having been touched by a Tier-0. In this scenario, a special Virtual Routing and Forwarding (VRF) may be used to ensure that traffic sourced from a particular Tier-1 (1 of 8) will get recycled through a different Tier-1. This ensures that traffic automatically re-arranges around AOC failures.

Tier-1 elements may handle recycled traffic differently than first-pass traffic. Traffic sourced from a Tier-0 with VID=99 is known to be undeliverable by the Tier-0 that is sourcing it. Therefore this VID-99 distinguished traffic is sent to the alternate-path Tier-0. In an embodiment, recycled traffic does not pass through an ECMP Active/Standby selector at the Tier-1. Instead the Tier-1 may forward this traffic to the opposite Tier-0 from which it came. VID=99 tagged traffic from Normal Tier-0 routes to its peer, the 'Protect' Tier-0. VID=99 tagged traffic from Protect Tier-0 routes to its peer, the 'Normal' Tier-0. A pair of VRFs that key from the source device port and VLAN tag may be used to implement this static routing.

Since traffic sourced from Tier-1 with VID=99 is known to be undeliverable by the peer Tier-0, when such traffic is received by any Tier-0, the traffic is sent directly to the destined server regardless of Link-Up or Link-Down at that server. When the server port is 'link-Up', traffic may be forwarded to the destination server using this second Tier-0's DAC connection. When the server port is 'Link-Down', this is the second chance (the last chance) to deliver the traffic, so if this second delivery attempt fails (using this Tier-0's alternative DAC path) then the traffic may be discarded.

In one embodiment, border gateway protocol (BGP) is not involved in implementing a fail-over to the alternate path. The ECMP member qualification/disqualification implements the failover mechanism to work around impairments.

These alternate paths and VLAN applications may be pre-provisioned to forward traffic that has been recycled by either Tier-0 because of the Normal/Protect Tier-0 topology and the appropriate provisioning can be performed at boot time.

Fail-over paths may be configured prior to the failure. The topology for the Normal/Protect Tier-0s and the eight Tier-1s is known before-hand, and these network elements can be prepared for a failure of the active path (DAC failure or Active ToR failure). Fail-over may be initiated independently by the element that detects the failure. The neighbors to that element may be configured to receive and forward that traffic along the prior-established Standby path without high-level software intervention.

In an embodiment, the server may be configured to only send/receive on one of its QSFP's dual physical interfaces at a time. Traffic that is shunted to the new path (to work around a failure) may be discarded at the Server/ToR interface until the new interface Links-Up. Neither the server CPU nor the coming-active ToR CPU are required to take actions to bring this link up. The dedicated OOB hardware signal may be used to determine to put the new interface in service, and it may be driven by the element (Normal Tier-0, Protect Tier-0, or Server) that triggers the fail-over sequence.

Figure 4:
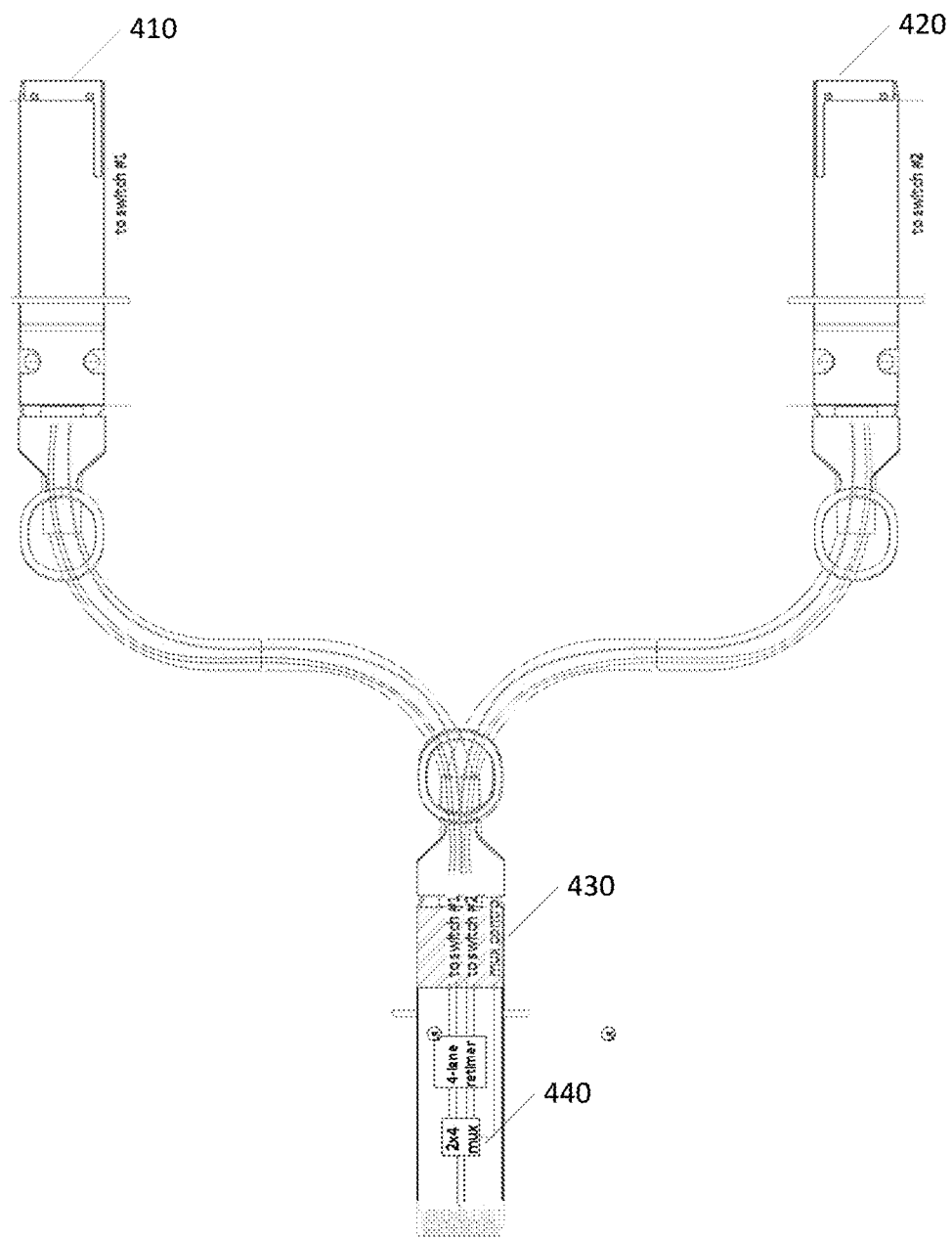
FIG. 4 is an example cable in accordance with the present disclosure.

In some embodiments, FIG. 4 illustrates an example Y-cable that may be used as disclosed herein. In this example, connectors 410 and 420 may be connected to diverse network interfaces. Connector 430 may be connected to the server-side interface. A multiplexer 440 is controllable via a control signal to select one of the network interfaces.

Figure 5:
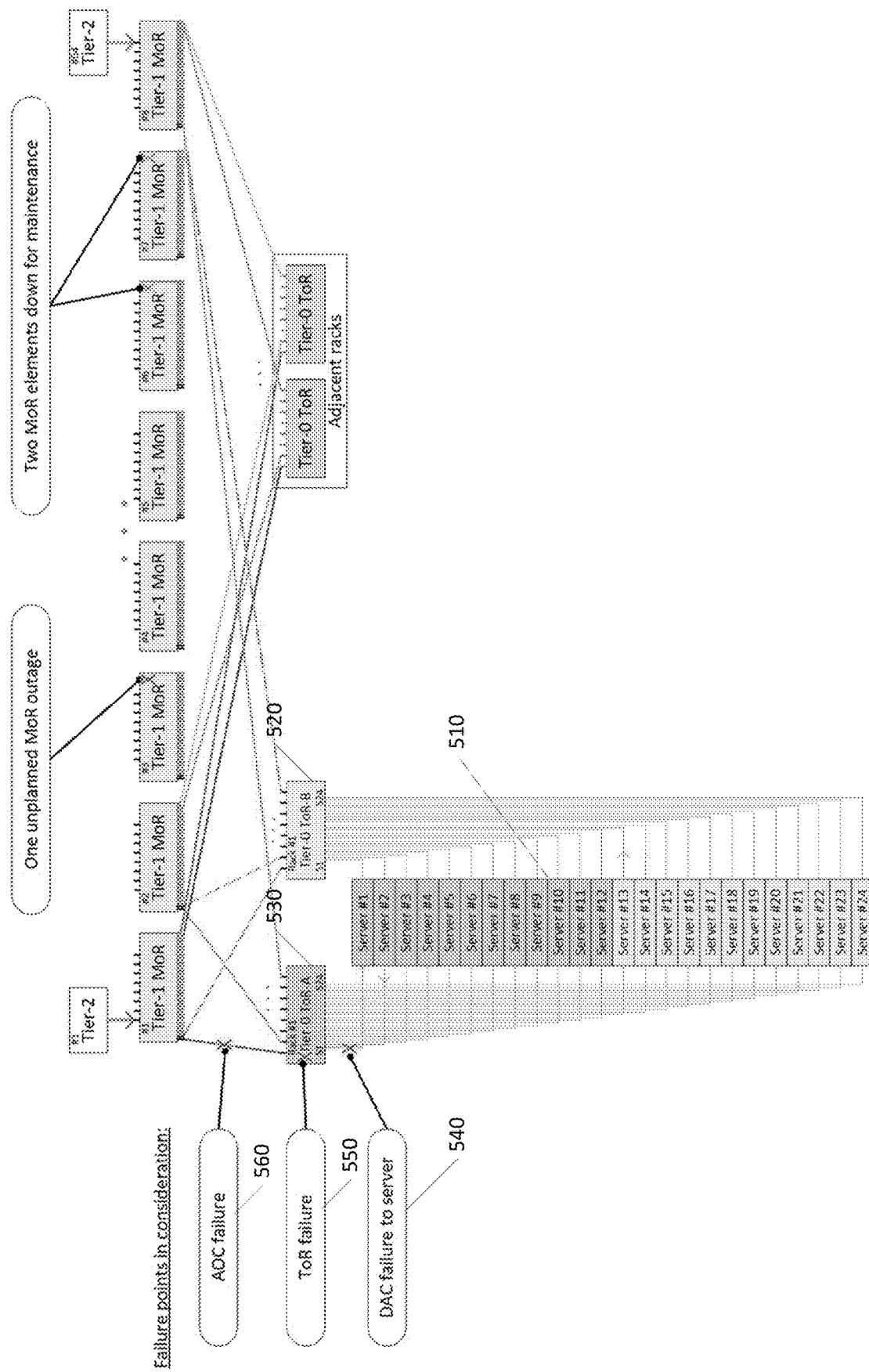
FIG. 5 is a system diagram in accordance with the present disclosure.
Figure 6:
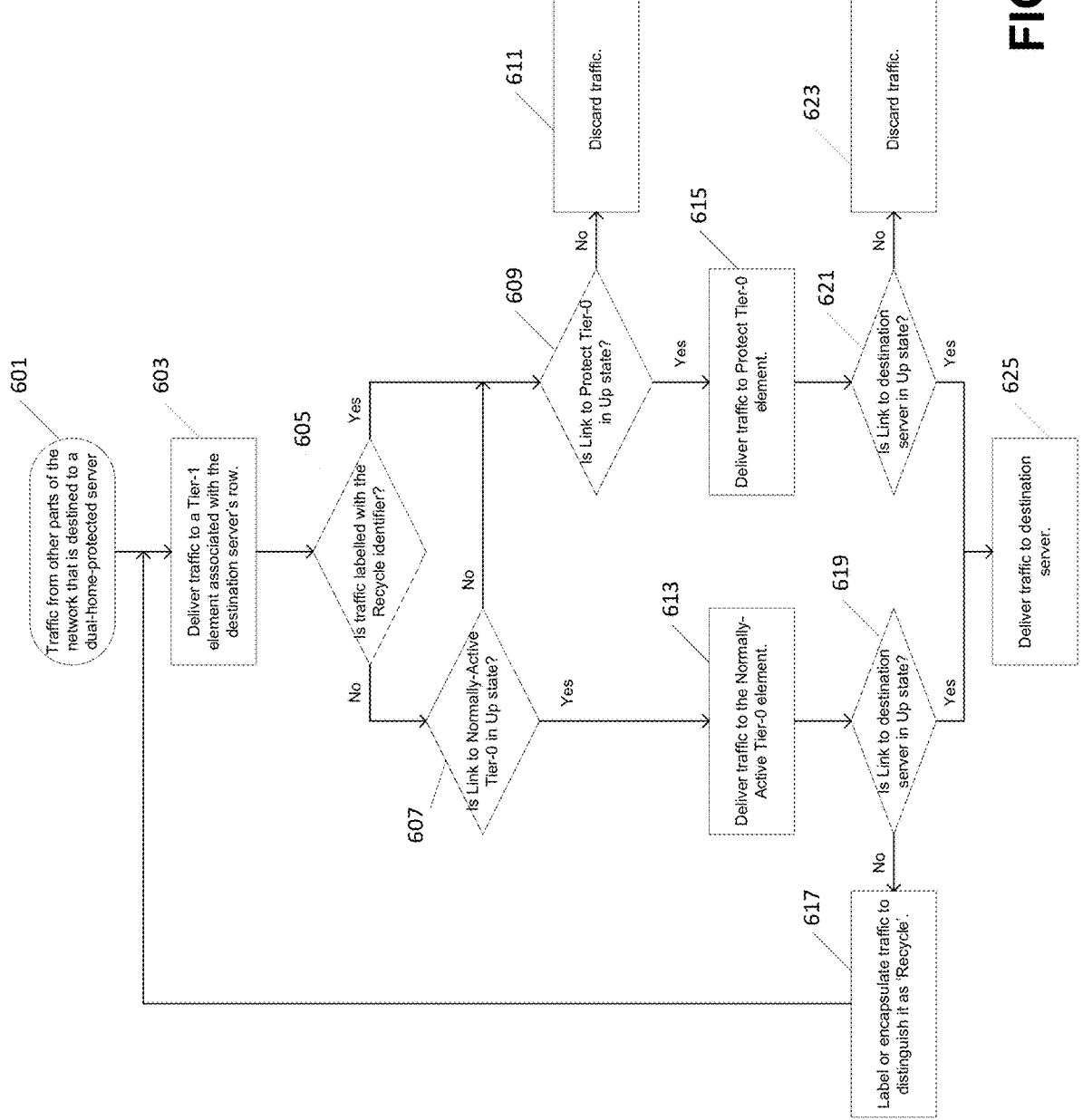
FIG. 6 is an example flowchart in accordance with the present disclosure.

In some embodiments, such as in FIG. 5, illustrated is an example describing some of the techniques as disclosed herein. Illustrated is a rack of 24 servers 510 that are each connected to two Tier-0 ToR switches 520, 530. A failure at a Tier-0 ToR 550, corresponding DAC 540, or active optical cable (AOC) 56, or other failure may result in a switchover to the alternate Tier-0 ToR switch. The two Tier-0 elements may normally each carry half the rack's network load. With any two MoR elements offline due to maintenance, the system may have alternate traffic path solutions for these scenarios:

1. Any single DAC failure to any number of servers, plus:
   Any Single AOC failure between Tier-0 and Tier-1 elements, and
   Tolerate either a second AOC failure or one unplanned MoR outage
2. —Any single Tier-0 element failure, plus
   Any single AOC failure between the remaining Tier-0 and Tier-1 elements, and
   Tolerate either a second AOC failure or one unplanned MoR outage Turning now to FIG. 6, illustrated is an example flowchart for implementing a fault resilient mechanism in accordance with the present disclosure. The flowchart describes operations of an example application that is configured to direct traffic along one of the two paths made available by the dual-homing cable as disclosed herein. Operation 601 illustrates incoming traffic is received from other parts of the network that is destined for a protected destination server as disclosed herein. Operation 603 illustrates that the traffic is delivered to a Tier-1 network element associated with the destination server's row. Operation 605 illustrates determining if the traffic is labeled with the recycle identifier. If the traffic is not labeled with the recycle identifier, then operation 605 may be followed by operation 607 which illustrates determining if the link to the normally active Tier-0 is in an Up state. If the link to the normally active Tier-0 in an Up state, then operation 607 may be following by operation 613 which illustrates delivering traffic to the normally active Tier-0 element. If the link to the normally active Tier-0 in not an Up state, then operation 607 may be following by operation 609 which illustrates determining if the link to protect Tier-0 is in an Up state.

If, in operation 605, it is determined that the traffic is labeled with the recycle identifier, then operation 605 may be followed by operation 609 which illustrates determining if the link to protect Tier-0 is in an Up state.

If, in operation 609, it is determined that the link to protect Tier-0 is not in an Up state, then operation 609 may be followed by operation 611 which illustrates discarding the traffic. If, in operation 609, it is determined that the link to protect Tier-0 is in an Up state, then operation 609 may be followed by operation 615 which illustrates delivering traffic to the protect Tier-0 element.

Operation 615 may be followed by operation 621 which illustrates determining if the link to the destination server is in an Up state. If the link to the destination server is not in an Up state, then operation 621 may be followed by operation 623 which illustrates discarding the traffic. If the link to the destination server is in an Up state, then operation 621 may be followed by operation 625 which illustrates delivering traffic to the destination server.

Operation 613 may be followed by operation 619 which illustrates determining if the link to the destination server is in an Up state. If the link to the destination server is not in an Up state, then operation 619 may be followed by operation 617 which illustrates labeling or encapsulating traffic to distinguish the traffic as "recycle." Operation 617 may be followed by operation 603. If the link to the destination server is in an Up state, then operation 619 may be followed by operation 625 which illustrates delivering traffic to the destination server.

Figure 7:
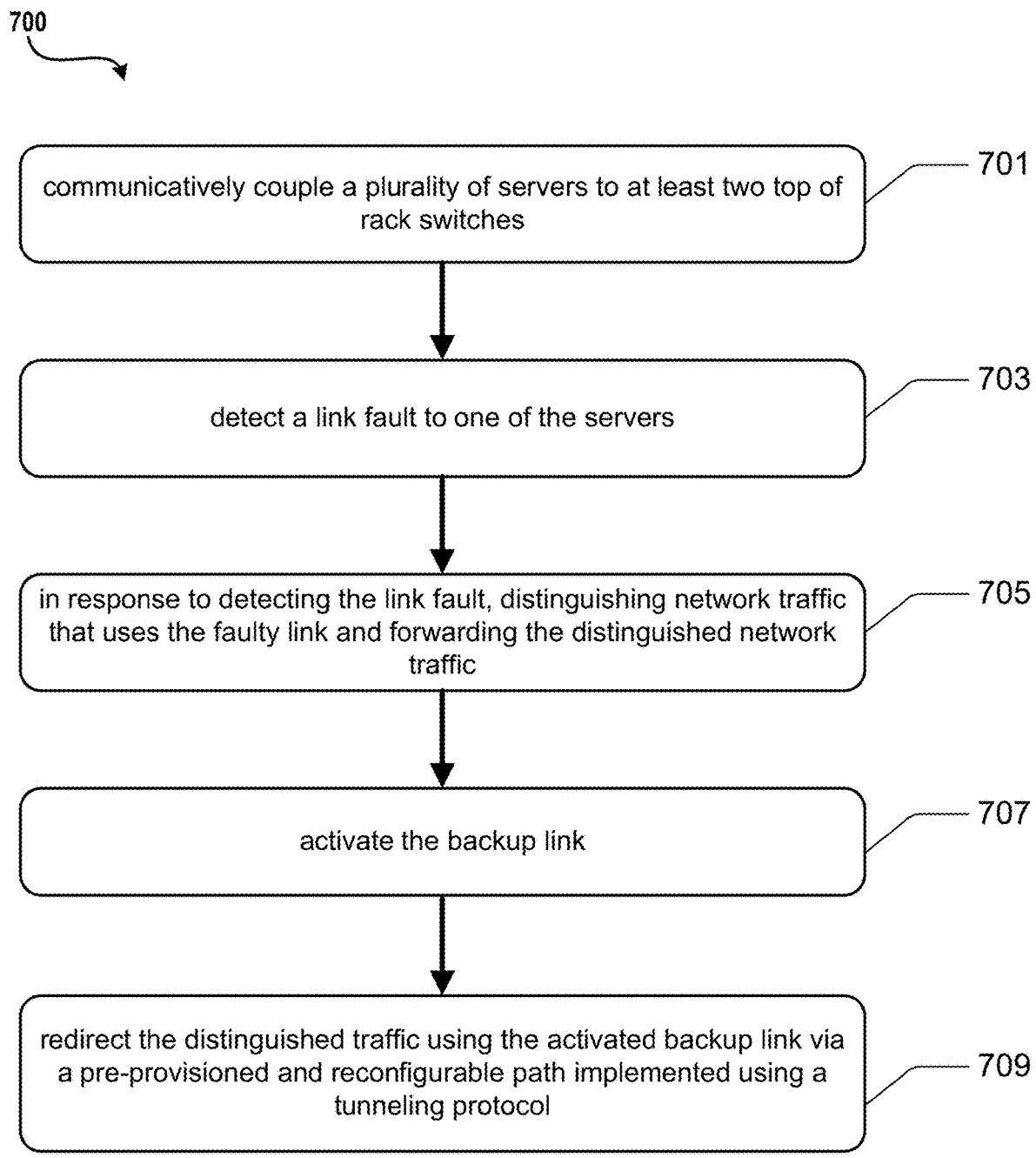
FIG. 7 is a flowchart depicting an example procedure in accordance with the present disclosure.

Turning now to FIG. 7, illustrated is an example operational procedure for implementing a fault resilient mechanism in accordance with the present disclosure. The operational procedure may be implemented in a system comprising one or more computing devices. Referring to FIG. 7, operation 701 illustrates communicatively coupling a plurality of servers to at least two top of rack switches. In an embodiment, each server of the plurality of servers is connected to first of the switches via an active link and a second of the switches via a backup link. The active and backup links may be coupled via a physical or media layer switch.

Operation 701 may be followed by operation 703. Operation 703 illustrates detecting a link fault to one of the servers.

Operation 703 may be followed by operation 705. Operation 705 illustrates in response to detecting the link fault, distinguish network traffic that uses the faulty link and forward the distinguished network traffic. The term "distinguishing" may generally be defined as providing a way to identify network traffic, for example by tagging a packet or frame.

Operation 705 may be followed by operation 707. Operation 707 illustrates activating the backup link.

Operation 707 may be followed by operation 709. Operation 709 illustrates redirecting the distinguished traffic using the activated backup link via a pre-provisioned and reconfigurable path implemented using a tunneling protocol.

In some embodiments, a control signal may be implemented to indicate an active communication path corresponding to one of the two links. The control signal may be activated by one or more link elements, which may include top of rack switches, middle of rack switches, and other network elements that are configured to determine that a fault has occurred.

The following illustrates example failure responses for DAC failures detected at the Tier-0 level.
DAC Cable Failure (ToR Perspective)
DAC unplugged from one ToR
DAC fatigue or manufacturing defect causes open/short circuit on active-path conductors (server outputs/ToR inputs)
Triggers
"Module Absent" QSFP short-pin interrupt at ToR port
Link-Down (loss of signal, loss of PCS lock, etc.) at ToR port
Quick Restoration Response
Currently-active ToR disqualifies this port from the ToR's server-specific 2-way ECMP group so that all in-flight traffic destined to the server recirculates through the pre-provisioned Recycle path back up to the Tier-1s. Tier-1s use pre-provisioned static routes to deliver Recycle traffic to the peer Tier-0.
Currently-active ToR toggles the OOB signal to force the server to Link-Up with the peer ToR.
Standby ToR Links Up to the Server. Its 2-way ECMP was already pre-provisioned to prefer this path, and now that Link is Up, is able to forward traffic immediately.
At some later time, the Tier-0 elements socialize their decision to swap active/standby states for this particular server to the Tier-1s. The Tier-1s update their server-specific 2-way ECMP to forward traffic directly to the actually-Active Tier-0 to eliminate unnecessary Recycling
High BER from Server
Triggers
High level software compares BER or SER between the Active and Standby Links. When a significant BER improvement is expected, the high-level software commands a switchover. Possible error count sources are:
a. Failed FCS on Ethernet frames
b. PCS errors
c. FEC Symbol Errors
Quick Restoration Response
Currently-active ToR disqualifies this port from the ToR's server-specific 2-way ECMP group so that all in-flight traffic destined to the server recirculates through the pre-provisioned Recycle path back up to the Tier-1s. Tier-1s use pre-provisioned static routes to deliver Recycle traffic to the peer Tier-0.
Currently-active ToR toggles the OOB signal to force the server to Link-Up with the peer ToR.
Standby ToR Links Up to the Server. Its 2-way ECMP was already pre-provisioned to prefer this path, and now that Link is Up, is able to forward traffic immediately.
At some later time, the Tier-0 elements socialize their decision to swap active/standby states for this particular server to the Tier-1s. The Tier-1s update their server-specific 2-way ECMP to forward traffic directly to the actually-Active Tier-0 to eliminate unnecessary Recycling.
The following are example failure responses for DAC failures detected by the server:
DAC cable failure (Server perspective)
DAC unplugged from Active Tier-0
DAC fatigue or manufacturing defect causes open/short circuit on active-path conductors (server inputs/Active Tier-0 outputs)
Triggers
Link-Down (loss of signal, loss of PCS lock, etc.) at Server port
Quick Restoration Response
Server ToR toggles the OOB signal to force the server to Link-Up with the Standby ToR
Currently-active ToR sees OOB signal toggle so this Tier-0 port goes Link-Down. This Tier-0 disqualifies this port from its server-specific 2-way ECMP group so that all in-flight traffic destined to the server recirculates through the pre-provisioned Recycle path back up to the Tier-1s. Tier-1s use pre-provisioned static routes to deliver Recycle traffic to the Standby Tier-0.
Standby ToR Links Up to the Server. Its 2-way ECMP was already pre-provisioned to prefer this path, and now that Link is Up, is able to forward traffic immediately.
At some later time, the Tier-0 elements socialize their decision to swap active/standby states for this particular server to the Tier-1s. The Tier-1s update their server-specific 2-way ECMP to forward traffic directly to the actually-Active Tier-0 to eliminate unnecessary Recycling.
High BER from Active ToR
Triggers
High level software compares BER or SER between the Active and Standby Links. When a significant BER improvement is expected, the high-level software commands a switchover at the server. Possible error count sources are,
Failed FCS on Ethernet frames
PCS errors
FEC Symbol Errors
PHY "SNR monitor"
Quick Restoration Response
Server ToR toggles the OOB signal to force the server to Link-Up with the Standby ToR
Currently-active ToR disqualifies this port from the ToR's server-specific 2-way ECMP group so that all in-flight traffic destined to the server recirculates through the pre-provisioned Recycle path back up to the Tier-1s. Tier-1s use pre-provisioned static routes to deliver Recycle traffic to the peer Tier-0.
Standby ToR Links Up to the Server. Its 2-way ECMP was already pre-provisioned to prefer this path, and now that Link is Up, is able to forward traffic immediately.
At some later time, the Tier-0 elements socialize their decision to swap active/standby states for this particular server to the Tier-1s. The Tier-1s update their server-specific 2-way ECMP to forward traffic directly to the actually-Active Tier-0 to eliminate unnecessary Recycling.
The following are example failure responses for an active Tier-0 element failure:
ToR with active traffic experiences
hard reset
power interruption
Triggers
Link-Down (loss of signal, loss of PCS lock, etc.) at each Tier-1 port and at Server port
OOB signal no longer actively driven by previously-active-Tier-0
a. Server QSFP HW senses undriven OOB signal
b. Standby-Tier-0 senses undriven OOB signal
Restoration Response
Tier-1s respond to Link-Down to disqualify the ports facing the off-going Tier-0 from the Tier-1's server-specific 2-way ECMP groups that are associated with the off-going Tier-0 so that traffic is diverted to the alternate Tier-0.

Server responds to Link-Down or undriven OOB to toggle the OOB signal to force the server to Link-Up with the alternate Tier-0.

Peer Tier-0 responds to undriven OOB to toggle the OOB signal to force the server to Link-Up with the alternate Tier-0.

Tier-0 with active traffic fails to generate heartbeat messages

Non-intrusive soft reset or image upgrade goes wrong (doesn't check in at predefined time)
    Application hangs
    CPU peripheral failure
    Triggers
    Consecutive absent BFD packets above threshold (sub-second response)
    MoR elements timeout their router adjacency (multi-second response if BFD not used)
    Peer Tier-0 sees consecutive absent heartbeat packets above threshold (sub-second response)
    Restoration Response
    Tier-1s and Standby Tier-0 socialize the decision to switch away from the off-going Tier-0 so that all Tier-1s and Standby Tier-0 react in bloc to rearrange traffic away from the off-going Tier-0.
    Tier-1s disqualify the ports facing the off-going Tier-0 from the Tier-1's server-specific 2-way ECMP groups that are associated with the off-going Tier-0 so that traffic is diverted to the alternate Tier-0.
    Standby Tier-0 responds by toggling the OOB signal to force the server to Link-Up with the Standby Tier-0.

Commanded reset of Active Tier-0
    Triggers
    'Dying Gasp' packets received by Tier-1 and peer Tier-0 elements.
    Restoration Response
    Tier-1s and Standby Tier-0 socialize the decision to switch away from the off-going Tier-0 so that all Tier-1s and Standby Tier-0 react in bloc to rearrange traffic away from the off-going Tier-0.
    Tier-1s disqualify the ports facing the off-going Tier-0 from the Tier-1's server-specific 2-way ECMP groups that are associated with the off-going Tier-0 so that traffic is diverted to the alternate Tier-0.
    Standby Tier-0 responds by toggling the OOB signal to force the server to Link-Up with the Standby Tier-0.

The following are example failure response for an AOC failure:

AOC between the Active Tier-0 and one of the Tier-1 elements fails (Failure as perceived from a single Tier-1 element, so that element acts alone to re-route traffic.)
    Triggers
    Only a Link-Down event is seen by the MoR port facing that ToR.
    No Dying Gasp has been received.
    Quick Restoration Response
    A single Tier-1 disqualifies the port facing the unreachable Tier-0 from that Tier-1's server-specific 2-way ECMP groups that are associated with that Tier-0 so that traffic is diverted to the Standby Tier-0. —Action is performed at SDK level.
    Standby Tier-0 doesn't recognize its peer as offline, so the Standby-state 2-way ECMP forwards the server-bound traffic back up to the other Tier-1 elements using the pre-provisioned Recycle path—no CPU action required.
    Other Tier-1 elements route to the active-ToR using good AOC connections and pre-provisioned static routes dedicated to Recycle traffic—no CPU action required.

AOC between the Active Tier-0 and one of the Tier-1 elements fails (Failure as perceived from the active Tier-0, so that Tier-0 element acts alone to re-route traffic.)
    Triggers
    A Link-Down event is seen by the active Tier-0.
    Quick Restoration Response
    The active Tier-0 disqualifies the port facing the unreachable Tier-1 from the 8-way ECMP group representing the Tier-1 as the Next Hop. —Action is performed at SDK level.
    Traffic that was being sourced from that particular Tier-1 will start being received from the other seven Tier-1s with VLAN=99 tags. No host CPU action is required at the affected Tier-0. The Tier-0 simply pops the VID=99 tags and forwards this traffic straight to the servers.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPS oC), etc. A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 8:
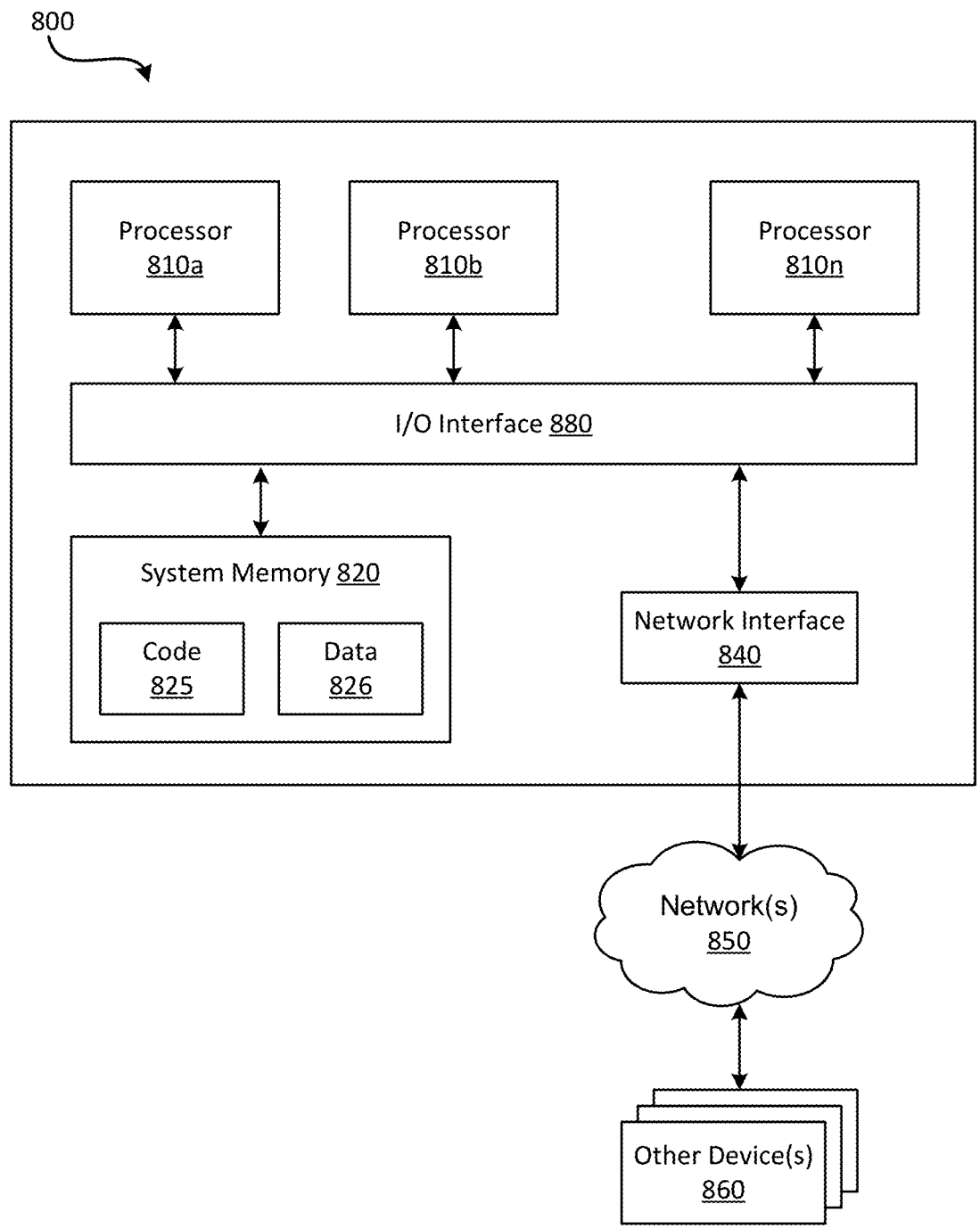
FIG. 8 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 8 illustrates such a general-purpose computing device 800. In the illustrated embodiment, computing device 800 includes one or more processors 810a, 810b, and/or 810n (which may be referred herein singularly as "a processor 810" or in the plural as "the processors 810") coupled to a system memory 820 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 820 as code 825 and data 826.

In one embodiment, I/O interface 880 may be configured to coordinate I/O traffic between the processor 810, system memory 820, and any peripheral devices in the device, including network interface 840 or other peripheral interfaces. In some embodiments, I/O interface 880 may perform any necessary protocol, timing, or other data transformations to convert data signals from one component (e.g., system memory 820) into a format suitable for use by another component (e.g., processor 810). In some embodiments, I/O interface 880 may include support for devices attached through various types of peripheral buses, such as a variant of the Peripheral Component Interconnect (PCI) bus standard or the Universal Serial Bus (USB) standard, for example. In some embodiments, the function of I/O interface 880 may be split into two or more separate components. Also, in some embodiments some or all of the functionality of I/O interface 880, such as an interface to system memory 820, may be incorporated directly into processor 810.

Network interface 840 may be configured to allow data to be exchanged between computing device 800 and other device or devices 860 attached to a network or network(s) 850, such as other computer systems or devices as illustrated in FIGS. 1 through 4, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-7 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 800 via I/O interface 880. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

EXAMPLE CLAUSES

The disclosure presented herein encompasses the subject matter set forth in the following example clauses.

Example Clause A, a method for routing data at a rack comprising a plurality of servers and at least two top-of-rack switches, the method comprising:
  on each of the plurality of servers, duplicating data signals on two network interfaces of a network interface card, each of the network interfaces communicatively coupled to a different one of the two top-of-rack switches via a physical or media layer switch;
  activating a control signal to indicate an active communication path from one of the switches to one or more of the servers, the active communication path corresponding to a first of the two network interfaces;
  in response to detecting a failure of the active communication path, modifying, by at least one of the switches or one of the servers, the control signal to indicate a switch to the second of the two network interfaces, wherein the active and alternate communication paths are pre-provisioned to forward current session traffic addressed to one of the plurality of servers using short path labels; and
  diverting data signals of the current session traffic via the alternate communication path using the short path labels.

Example Clause B, the method of Example Clause A, wherein the two network interfaces are implemented by a physical layer device at an end of a Direct Attach Cable (DAC).

Example Clause C, the method of any one of Example Clauses A through B, wherein the out-of-band control plane signal is implemented using an additional conductor on the DAC.

Example Clause D, the method of any one of Example Clauses A through C, wherein the out-of-band control plane signal is one of a 2-level active/standby signal or a multi-master serial bus.

Example Clause E, the method of any one of Example Clauses A through D, wherein a network element of the alternate communication path initiates a fail-over to the alternate communication path when a network element of the active communication fails to generate heartbeat messages for a predetermined duration.

Example Clause F, the method of any one of Example Clauses A through E, further comprising initiating a fail-over to the alternate communication path when the active communication path degrades below a threshold.

Example Clause G, the method of any one of Example Clauses A through F, wherein the active communication path and alternate communication path use equal-cost multi-path (ECMP) routing.

Example Clause H, the method of any one of Example Clauses A through G, wherein data paths to each server are consolidated into a single 2-member ECMP group.

Example Clause I, the method of any one of Example Clauses A through H, wherein when a communication path is down, a 2-way ECMP automatically selects an alternative member.

Example Clause J, the method of any one of Example Clauses A through I, wherein data traffic that is undeliverable to a server due to a link failure is recycled up to tier 1 elements using a packet header that is pre-designated to associate with a destination server that the traffic is intended for.

Example Clause K, the method of any one of Example Clauses A through J, wherein a tunneling protocol is used to forward traffic along a pre-provisioned label-switched path associated with a destination server.

While Example Clauses A through K are described above with respect to a method, it is understood in the context of this disclosure that the subject matter of Example Clauses A through K can additionally or alternatively be implemented by a device or via a system.

Example Clause L, a system comprising:
a plurality of servers communicatively coupled to at least two top-of-rack switches, wherein each server of the plurality of servers is connected to a first of the switches via an active link and a second of the switches via a backup link, the active and backup links coupled via a physical or media layer switch; and
wherein the system is further configured to:
detect a link fault to one of the servers;
in response to detecting the link fault, distinguish network traffic that uses the faulty link and forward the distinguished network traffic;
activate the backup link; and
redirect the distinguished traffic using the activated backup link via a pre-provisioned and reconfigurable path implemented using a tunneling protocol.

Example Clause M, the system of Example Clause L, wherein the system is further configured to send, by devices with active server connections, a copy of active-state-flow routing tables to standby devices.

Example Clause N, the system of any one of Example Clauses L through M, wherein the system is further configured to generate a loss of protection alarm when the backup link is not available.

Example Clause O, the system of any one of Example Clauses L through N, wherein backup links are activated based on a BER level of active and backup links.

While Example Clauses L through O are described above with respect to a system, it is understood in the context of this disclosure that the subject matter of Example Clauses L through O can additionally or alternatively be implemented by a device or via a method.

Example Clause P, a system comprising one or more components configured to:
on each of a plurality of servers, duplicate data signals on two network interfaces of a network interface card, the network interfaces communicatively coupled to diverse network devices via a physical or media layer switch;
activate, by one or more link elements, a control signal to indicate an active communication path corresponding to a first of the two network interfaces;
in response to detecting a failure of the active communication path, modify the control signal to indicate a switch to an alternate pre-provisioned communication path corresponding to a second of the two network interfaces; and
divert data signals of a current session traffic to the alternate communication path using a short path label protocol.

Example Clause Q, the method of Example Clause P, further configured to initiate a fail-over to the alternate pre-provisioned communication path when the active communication path degrades below a threshold.

Example Clause R, the system of any of Example Clauses P through Q, wherein the active communication path and alternate pre-provisioned communication path use equal-cost multi-path (ECMP) routing.

Example Clause S, the system of any one of Example Clauses P through R, wherein data paths to each server are consolidated into a single 2-member ECMP group.

Example Clause T, the system of any one of Example Clauses P through S, wherein data traffic that is undeliverable to a server due to a link failure is recycled up to tier 1 elements with a packet header that is pre-designated to associate with a destination server that the traffic is intended for.

While Example Clauses P through T are described above with respect to a system, it is understood in the context of this disclosure that the subject matter of Example Clauses P through T can additionally or alternatively be implemented by a method or via a device.

The invention claimed is:

1. A method for routing data at a rack comprising a plurality of servers and at least two lowest level top-of-rack switches connected to the plurality of servers, the method comprising:
on each of the plurality of servers, duplicating data signals on two network interfaces of a network interface card, each of the network interfaces communicatively coupled to a different one of the two top-of-rack switches via a physical or media layer switch;
activating a control signal to indicate an active communication path from one of the switches to one or more of the servers, the active communication path corresponding to a first of the two network interfaces;

in response to detecting a failure of the active communication path, modifying, by at least one of the switches or one of the servers, the control signal to indicate a switch to the second of the two network interfaces, the second network interface corresponding to an alternate communication path, wherein the active and alternate communication paths are pre-provisioned to forward current session traffic addressed to one of the plurality of servers using short path labels; and diverting data signals of the current session traffic via the alternate communication path using the short path labels.

2. The method of claim 1, wherein the two network interfaces are implemented by a physical layer device at an end of a Direct Attach Cable (DAC).

3. The method of claim 2, wherein the control signal is an out-of-band control plane signal implemented using an additional conductor on the DAC.

4. The method of claim 3, wherein the out-of-band control plane signal is one of a 2-level active/standby signal or a multi-master serial bus.

5. The method of claim 1, wherein the active communication path and alternate communication path use equal-cost multi-path (ECMP) routing.

6. The method of claim 5, wherein data paths to each server are consolidated into a single 2-member ECMP group.

7. The method of claim 6, wherein when a communication path is down, a 2-way ECMP automatically selects an alternative member.

8. The method of claim 1, further comprising imitating, by a network element of the alternate communication path, a fail-over to the alternate communication path when a network element of the active communication fails to generate heartbeat messages for a predetermined duration.

9. The method of claim 1, further comprising initiating a fail-over to the alternate communication path when the active communication path degrades below a threshold.

10. The method of claim 1, wherein data traffic that is undeliverable to a server due to a link failure is recycled up to tier 1 elements using a packet header that is pre-designated to associate with a destination server that the traffic is intended for.

11. The method of claim 1, wherein a tunneling protocol is used to forward traffic along a pre-provisioned label-switched path associated with a destination server.

12. A system comprising:

a plurality of servers communicatively coupled to at least two lowest level top-of-rack switches, wherein each server of the plurality of servers is connected to a first of the lowest level top-of-rack switches via an active link and a second of the lowest level top-of-rack switches via a backup link, the active and backup links coupled via a physical or media layer switch; and wherein the system is further configured to:

detect a link fault to one of the servers;

in response to detecting the link fault, distinguish network traffic that uses the faulty link and forward the distinguished network traffic;

activate the backup link; and redirect the distinguished traffic using the activated backup link via a pre-provisioned and reconfigurable path implemented using a tunneling protocol.

13. The system of claim 12, further configured to send, by devices with active server connections, a copy of active-state-flow routing tables to standby devices.

14. The system of claim 12, further configured to generate a loss of protection alarm when the backup link is not available.

15. The system of claim 12, wherein backup links are activated based on a BER level of active and backup links.

16. A system comprising one or more components configured to:

on each of a plurality of servers, duplicate data signals on two network interfaces of a network interface card, the network interfaces communicatively coupled to diverse lowest level network devices via a physical or media layer switch;

activate, by one or more link elements, a control signal to indicate an active communication path corresponding to a first of the two network interfaces;

in response to detecting a failure of the active communication path, modify the control signal to indicate a switch to an alternate pre-provisioned communication path corresponding to a second of the two network interfaces; and divert data signals of a current session traffic to the alternate communication path using a short path label protocol.

17. The system of claim 16, further configured to initiate a fail-over to the alternate pre-provisioned communication path when the active communication path degrades below a threshold.

18. The system of claim 16, wherein the active communication path and alternate pre-provisioned communication path use equal-cost multi-path (ECMP) routing.

19. The system of claim 16, wherein data paths to each server are consolidated into a single 2-member ECMP group.

20. The system of claim 16, wherein data traffic that is undeliverable to a server due to a link failure is recycled up to tier 1 elements with a packet header that is pre-designated to associate with a destination server that the traffic is intended for.

* * * * *